United States Patent [19]

Waly et al.

[11] 3,947,104

[45] Mar. 30, 1976

[54] COMPACT IMAGING APPARATUS AND PROJECTION DISPLAY DEVICE

[75] Inventors: Adnan Waly, Stamford, Conn.; George J. Yevick, Leonia, N.J.

[73] Assignee: Personal Communications, Inc., Stamford, Conn.

[22] Filed: Dec. 13, 1972

[21] Appl. No.: 314,710

Related U.S. Application Data

[63] Continuation-in-part of Ser. No. 176,805, Sept. 1, 1971, abandoned.

[52] U.S. Cl..................... 353/78; 353/99; 353/27 R
[51] Int. Cl.².................... G03B 21/28; G03B 23/08
[58] Field of Search.................... 353/98, 99, 74–78, 353/37, 51, 64

[56] References Cited
UNITED STATES PATENTS

| | | | |
|---|---|---|---|
| 1,551,259 | 8/1925 | Merriman | 353/78 |
| 3,507,571 | 4/1970 | White | 353/78 |
| 3,532,419 | 10/1970 | Tanaka | 353/78 |
| 3,738,744 | 6/1973 | Cassano | 355/5 |

*Primary Examiner*—Richard E. Aegerter
*Assistant Examiner*—A. J. Mirabito
*Attorney, Agent, or Firm*—St. Onge Mayers Steward & Reens

[57] ABSTRACT

A compact imaging apparatus and rear projection display device are described wherein an image of an object is focused on an image area which is displaced and rotated from the object plane. A pair of planar mirrors of predetermined shape are selectively located to fold the image beam from an image device and provide an image of desired orientation on the image area. A compact camera for producing a large image area in a small volume is described and is particularly useful in connection with so-called instantly developed photographic films. A rear projection device is described, having an optical arrangement which confers a high degree of immunity to ambient light. An image beam is projected upwardly against a first mirror, reflected toward a second mirror behind a projection screen, and then reflected forwardly to the projection screen. The display is highly immune to ambient light, since the general path of the image projection beam is always upward, whereas the general path of virtually all ambient light is downward. The use of two mirrors to fold the image beam in this manner introduces an unusual rotation of the projected image which, however, is taken into account in the design of the optical system. For the sake of ruggedness and precision, as well as economy of construction, the cabinet of a microform display device employing the described optical system is formed from a unitary block of polystyrene foam, the interior walls of which are faceted in an appropriate manner to provide mounting surfaces for the two mirrors. The same optical principle is applied also to the design of a combined electronic and optical display device enclosed within a CRT envelope, which is suitable for producing either an ephemeral read-out or hard copy.

4 Claims, 14 Drawing Figures

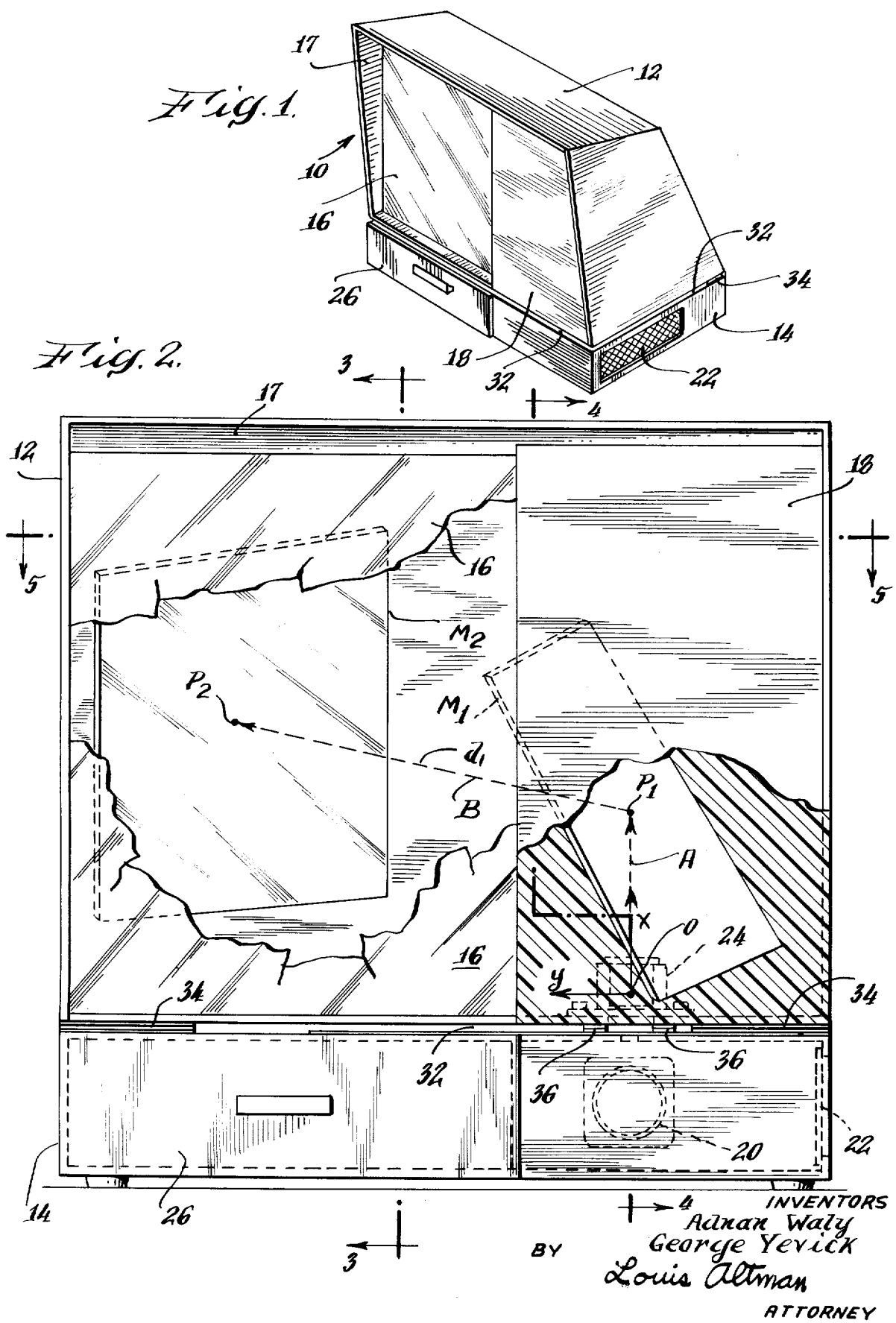

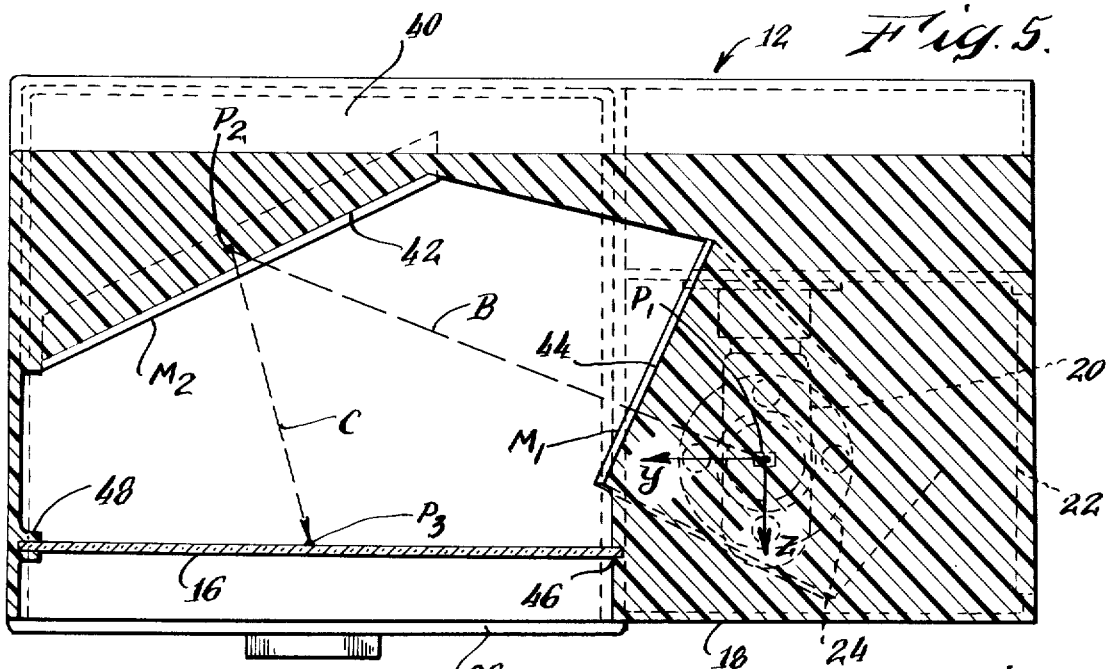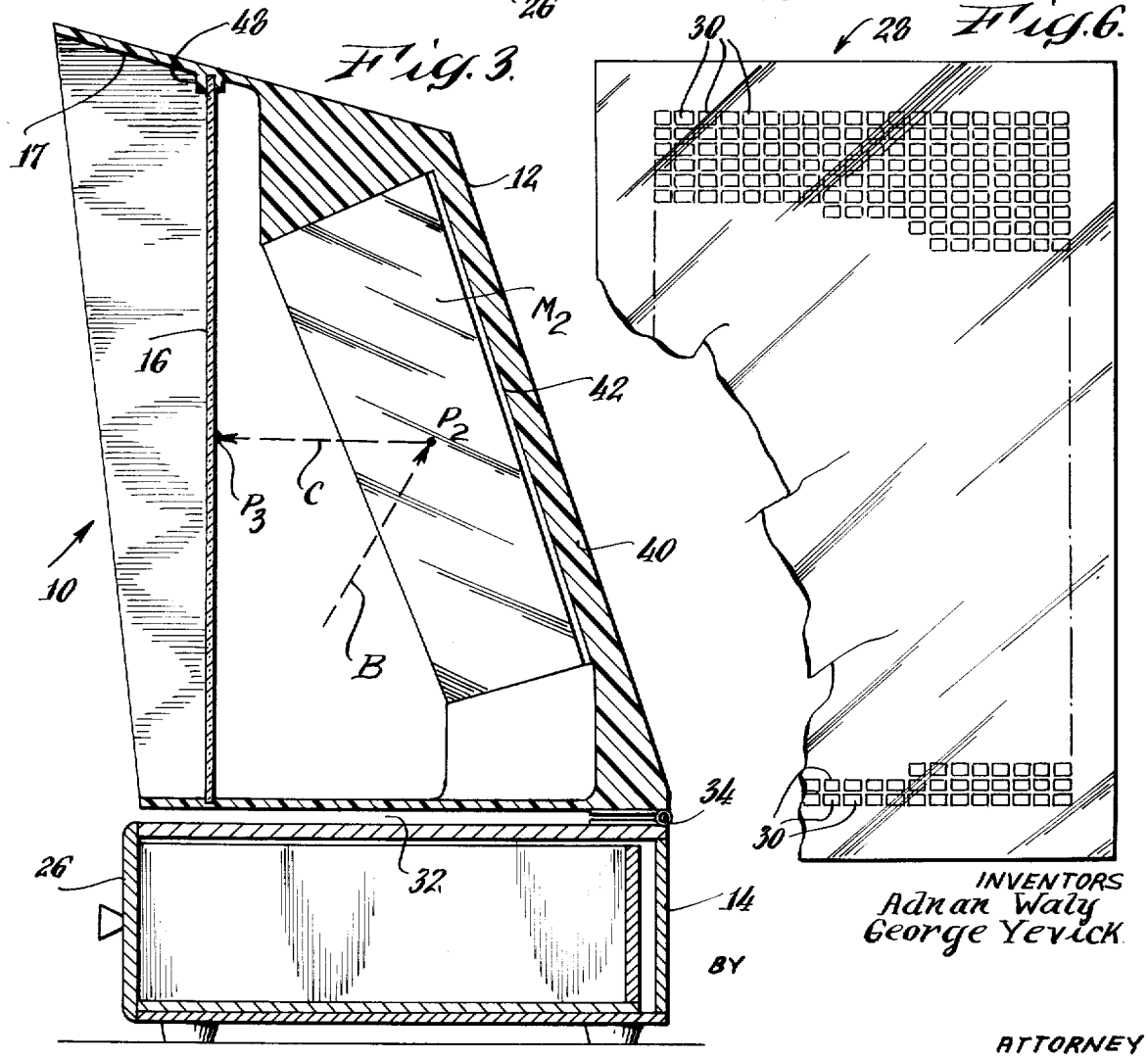

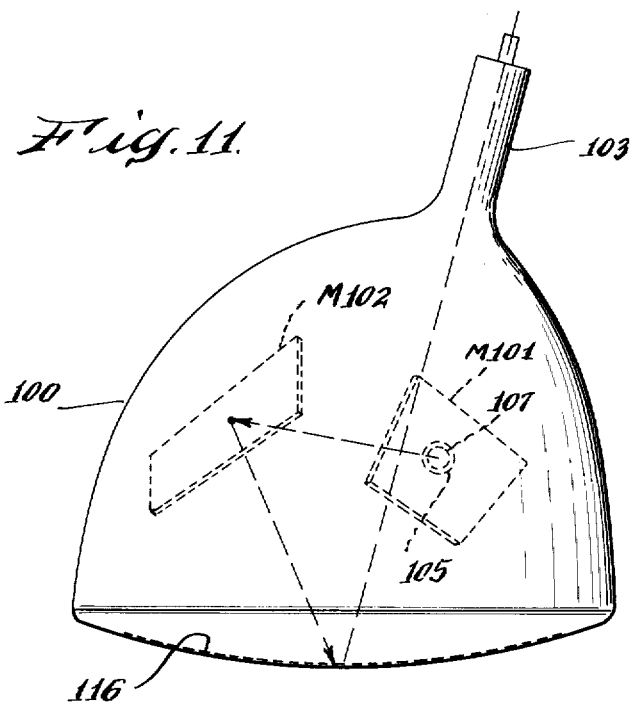
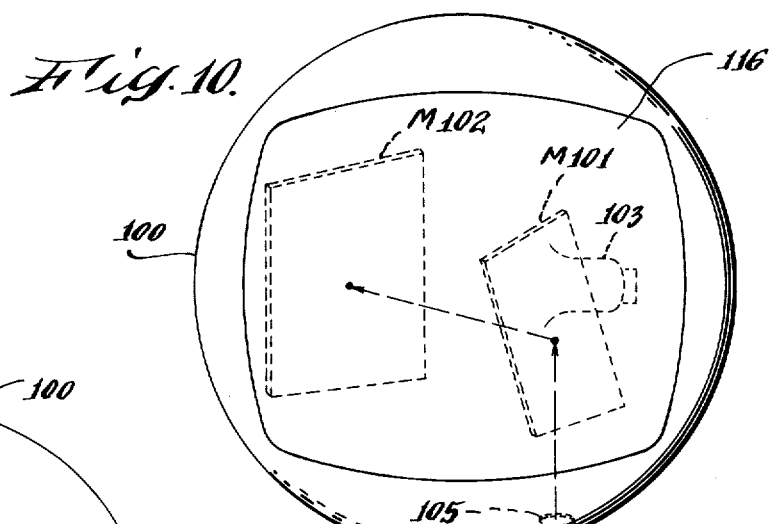
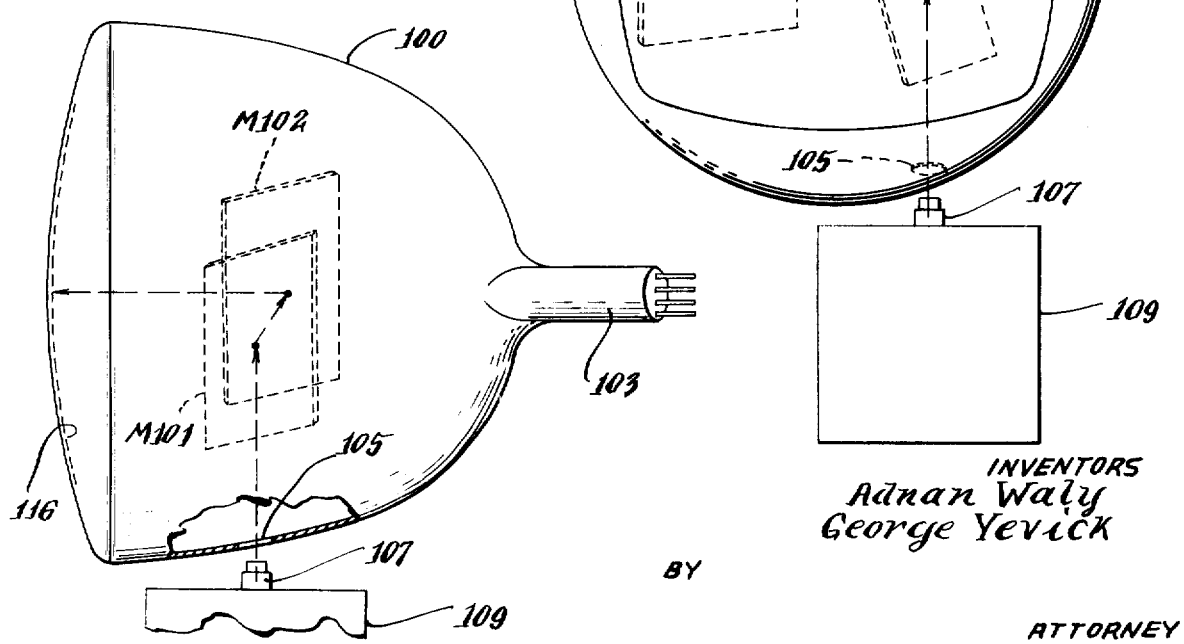

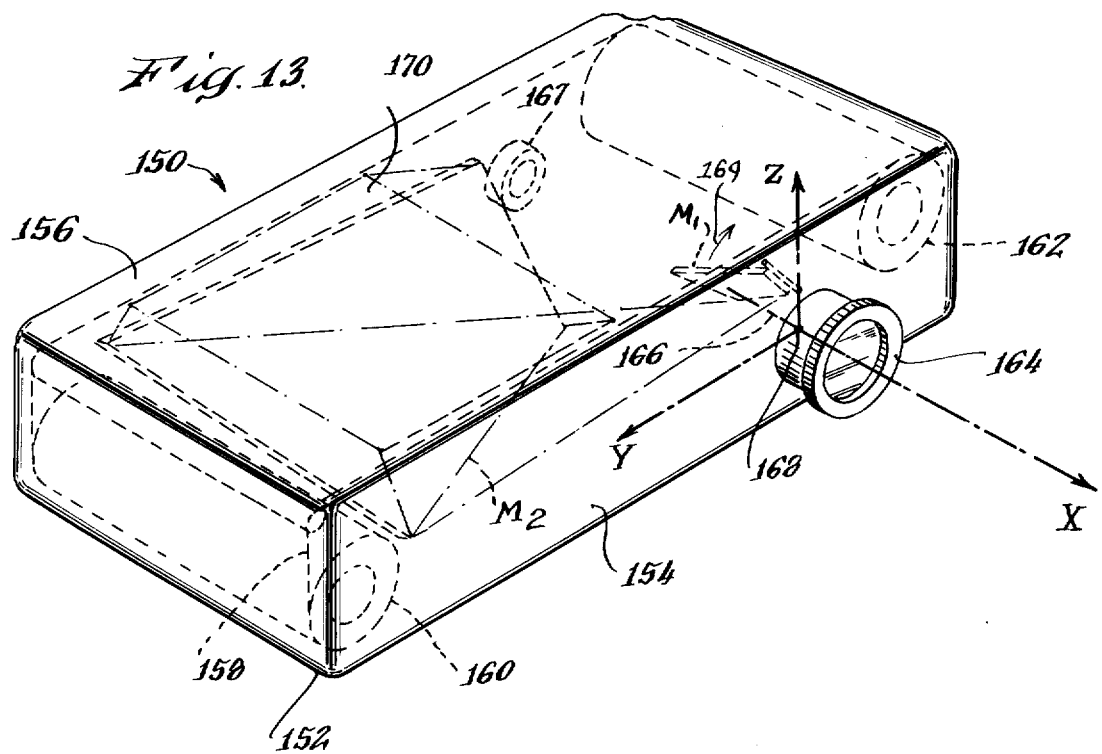
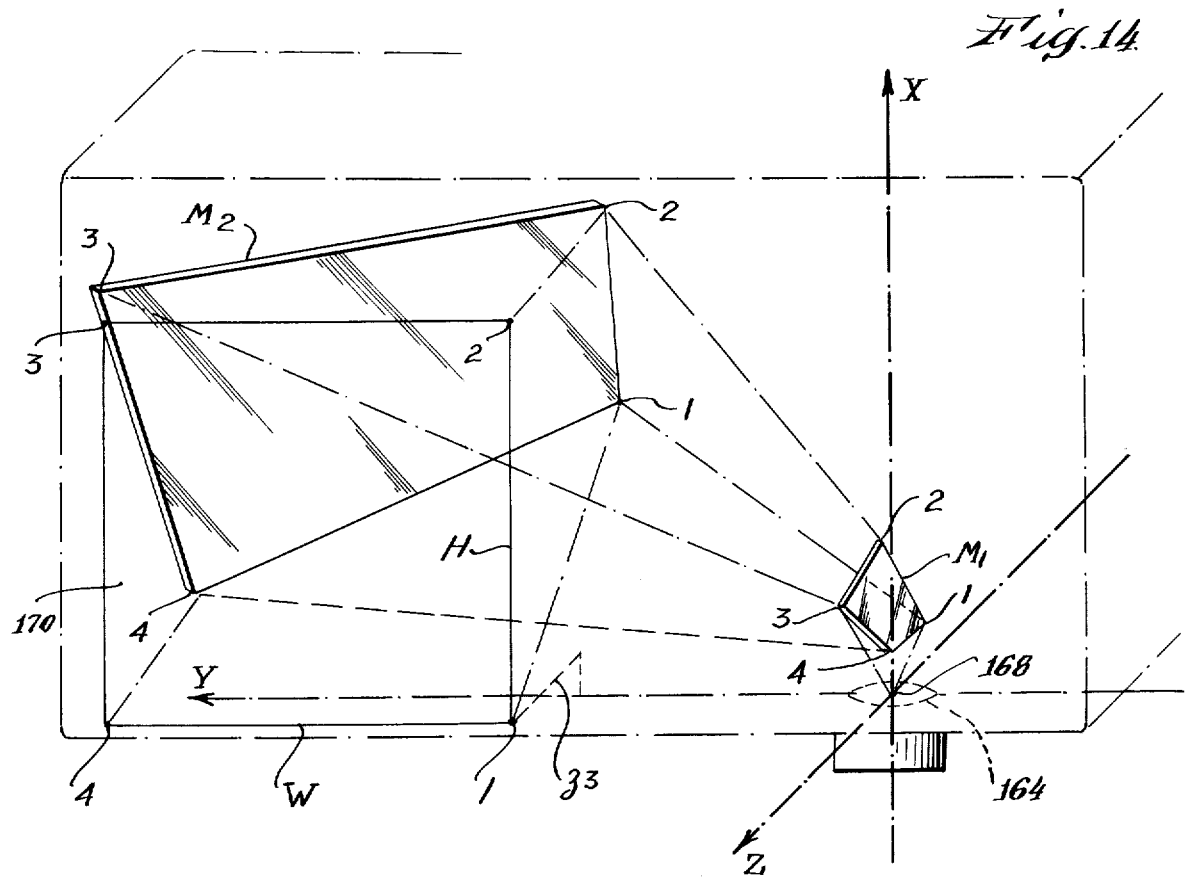

COMPACT IMAGING APPARATUS AND PROJECTION DISPLAY DEVICE

This application is a continuation in part of U.S. Pat. application entitled PROJECTION DISPLAY DEVICE filed by Adnan Waly and George J. Yevick on Sept. 1, 1971 bearing Ser. No. 176,805, now abandoned.

FIELD OF THE INVENTION

This invention relates to imaging devices generally and more specifically to photographic cameras and rear projection display devices, e.g., for microform documents, projection TV displays and the like.

BACKGROUND OF THE INVENTION

Imaging devices for cameras commonly employ a focusing lens whose image field is folded to produce a focused image in as small a volume as possible. The folding elements employ mirrors which are usually oriented at angles of 45° with the optical axis to fold the image field along directions which are transverse to the optical axis.

Projection display devices are widely used for enlarging small image sources by throwing them upon a viewing screen. Often the image source is some type of microform document, e.g. microfilm strip or a microfiche sheet containing graphic information of extremely small size, which must be enlarged by projection in order to be readable, or the image source may be a miniature cathode ray tube with such a small screen that reading of a detailed image is difficult, and optical projection is needed for the purpose of enlargement. In other instances, the screen of the CRT may be large enough for direct viewing by a small group, but there may be a need to project an enlarged image upon a theater-size screen for display to a large assembly or for other purposes.

Rear projection screens are translucent and have a light-dispersing frosting or coating. The image is seen from the front of the screen, but projected from behind the screen, from the interior of an opaque housing. Such projection devices are subject to degradation of the projected image by ambient light, and consequently they cannot be used easily under ordinary lighting conditions.

Ambient light striking the front surface of a rear projection screen is divided into two components, one reflected from and the other transmitted through the translucent screen. Until now the image degradation effect of the transmitted component has not been dealt with successfully in the design of rear projection equipment. This transmitted component passes through the screen into the interior of the projector housing, and there it strikes a mirror behind the screen, which performs an image beam folding function. In previous devices, this mirror was inclined upwardly in order that an image could be projected from a microform document or other image source located below the projection screen. We have observed that most sources of ambient light are located above the level of the projection equipment. For example, both sunlight and the light from interior room fixtures usually originates above the level of the desk or table upon which the projection display device is employed. As a result, such light is downwardly incident upon the projection screen, and the transmitted component of it tends to strike the upwardly inclined mirror inside the housing. It is then reflected back toward the display screen along an upward path which is generally similar to the path of the image beam.

Prior art rear projection display devices give poor results in brightly lit environments, and it is generally considered necessary to use such equipment in semi-darkness if a high quality image is desired. It appears to me that the principal cause of such image degradation in brightly lit environments is that component of the downwardly incident light which is transmitted through the translucent screen and reflected back to it by the internal mirror.

It would, of course, be possible to avoid retro-reflection of the transmitted component of ambient light be eliminating beam-folding mirrors, and projecting the image directly upon the rear surface of the screen in a straight line path. In order to obtain sufficient path length for adequate magnification, however, this approach would require the use of a housing extending far behind the projection screen. The purpose of using mirrors to fold the image projection beam is to permit the optical system to fit into a housing of reasonably small size and compact shape.

SUMMARY OF THE INVENTION

In an imaging device in accordance with the invention a beam-folding device is formed of two planar mirrors. The mirrors are skewed relative to the optical axis of an imaging device to provide both a displacement and rotation of the image. The mirrors are selectively oriented and placed to provide a focused image with a desired orientation upon an image area.

As described with reference to an embodiment of a camera in accordance with the invention, a generally flat rectangular housing is formed. An imaging device such as a lens is located in a narrow side wall of the housing to direct an image beam upon a first planar mirror. This first planar mirror is oriented in a skewed relationship with the optical axis of the imaging device. The first planar mirror reflects the beam towards a laterally displaced second planar mirror which is also skewed relative to the first reflected optical axis and is located to direct a focused image onto a photographic film. The film in turn is mounted parallel with the larger wall of the rectangular housing. The resulting image occupies a large area and is oriented in rectangular alignment with the film.

In effect, therefore, the image is transposed from a first plane, which is transverse to the optical axis and parallel to the narrow side wall, to an image area which is displaced from the optical axis and lies in a plane parallel with the larger wall of the rectangular housing.

An advantage of a camera formed in accordance with the invention is that a relatively flat and small housing may be used to produce a large area image. such large image may then be advantageously used to expose an instantly developed film for a large sized print.

The planar mirrors are quadrilaterally shaped to generate the desired rectangular focused image. The shape, location and orientation of the mirrors are determined in correspondence with design criteria such as the location, size and distance of the image area from a point of origin on the optical axis of the imaging device.

In a projection display in accordance with the invention the beam-folding system employs the two mirrors with downwardly inclined orientations. Consequently, any downwardly inclined ambient light passing through the projection screen into the interior of the housing, and striking the beam-folding mirrors, must necessarily be reflected downwardly by them, away from the projection screen; it cannot be reflected back upwardly toward the screen to cause image washout. One of these mirrors is situated directly behind the projection screen, and the other is off to one side of the projection screen, within its own opaque enclosure where the image beam originates. Thus, ambient light cannot enter the enclosure at the point where the image beam originates, and travel on a generally parallel path to the projection screen. The microform or other image source may be oriented horizontally and projected upwardly against the mirrors for reflection to the rear surface of the projection screen. This geometry introduces a complex image rotation, which must be taken carefully into account when selecting the angles of inclination of the mirrors.

BRIEF DESCRIPTION OF THE DRAWINGS

These and other advantages of the beam-folder and imaging device in accordance with the invention will be understood from the following description of several embodiments described in conjunction with the drawings wherein FIG. 1 is a perspective view of a projection display device in accordance with the present invention;

FIG. 2 is a front elevational view, with parts broken and sectioned for clarity of illustration, of the same projection display device;

FIG. 3 is a sectional view, taken along the line 3—3 of FIG. 2, looking in the direction of the arrows;

FIG. 5 is a sectional view, taken along the line 5—5 of FIG. 2, looking in the direction of the arrows;

FIG. 6 is a fragmentary top plan view of a microfiche document, which the device of the preceding figures is designed to enlarge and display;

FIG. 10 is a front elevational view of a combined cathode ray tube and optical projection display device;

FIG. 11 is a top plan view of the same combined display device;

FIG. 12 is a side elevation view of the same device;

FIG. 13 is a perspective view of a camera utilizing a beam-folding and imaging device in accordance with the invention; and FIG. 14 is an isometric representation of the beam folder and an associated orthogonal coordinate system employed to locate the beam-folding components of the camera shown in FIG. 13.

DETAILED DESCRIPTION OF THE PREFERRED EMBODIMENTS

Figure 4:
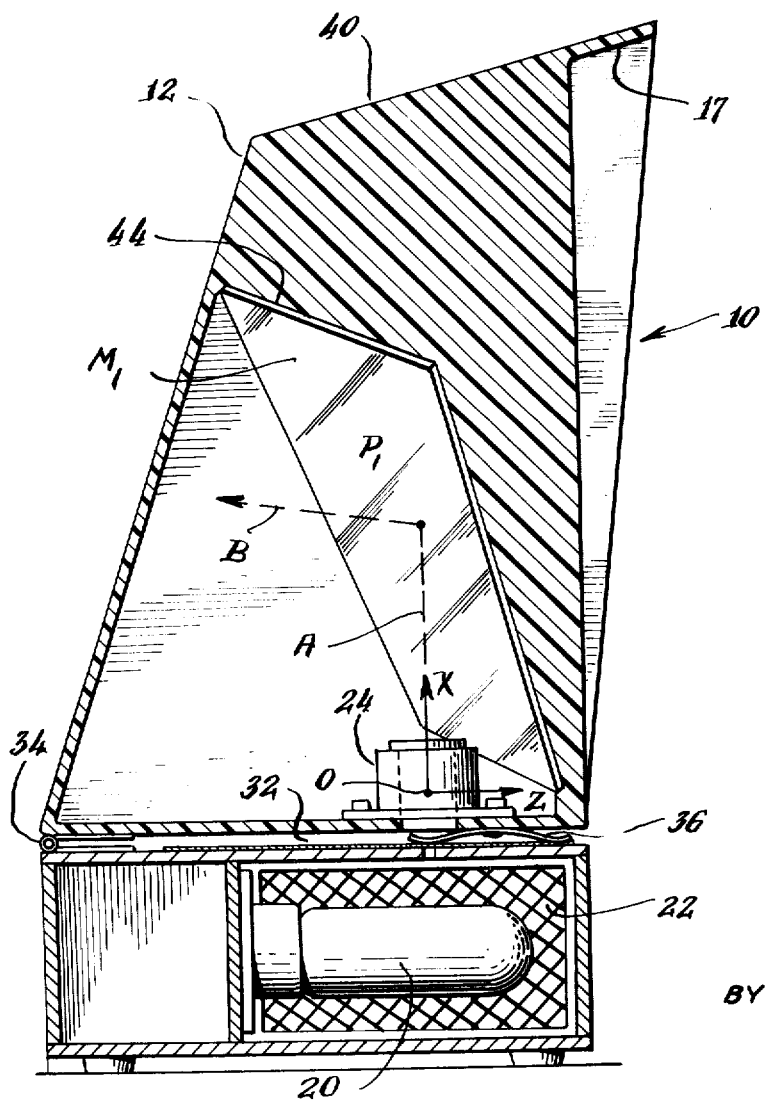
FIG. 4 is a sectional view taken along the line 4—4 of FIG. 2, looking in the direction of the arrows.

FIGS. 1 through 5 illustrate the invention as exemplified by an optical rear projection display device 10 specifically designed for use with microfiche documents. It includes a hollow housing or cabinet 12 set upon a base 14. The front wall of the housing 12 is divided into two parts. At the left side of the housing the front wall consists of a rear projection screen 16 formed of a sheet of transparent material such as glass, plastic or the like, having a frosted rear surface for image projection. At the right hand side of the housing 12 the front surface consists of an opaque wall 18 which defines a somewhat separate enclosure off to the side of the projection screen 16. The housing is formed with an extension 17 which surrounds the screen 16 and serves as a viewing hood to prevent reflected glare.

A projection lamp 20 is housed in the base 14 (see FIGS. 2, 4 and 5), and a ventilating screen 22 is provided in the right side wall of the base 14 to help dissipate the heat generated by the projection lamp. The lamp shines upwardly through a conventional beam converging lens assembly 24 toward a first mirror M1 which is located largely within the separate enclosure defined by the opaque front wall 18. The first mirror M1 reflects this light beam toward a second mirror M2 which is located directly behind the rear projection screen 16. Below the mirror M2 and the projection screen 16 is an empty space conveniently occupied by a supply drawer 26, which can be used to store microfiche documents.

A representative microfiche document 28 is illustrated in FIG. 6. This consists of a flat sheet of photographic film divided into a plurality of individual rectangular microform images 30. When used with the reader 10, the document 28 is received within a horizontal channel 32 defined between the upper housing 12 and the base 14. In order to open the channel 32 for microfiche insertion, the housing 12 is connected to the base 14 along the rear surfaces thereof by hinges 34, as best seen in FIGS. 3 and 4. The microfiche 28 is clamped firmly in a planar configuration between the projection lamp 20 and lens assembly 24 by a set of spring clips 36 seen in FIG. 4.

Ordinarily a single microform image 30 is viewed at one time when using the projection device 10 of this invention, and a suitable mechanism is employed for indexing left or right, and forwardly or rearwardly, so as to move the microfiche 28 from one microform image position to another. Such an indexing device forms no part of the present invention, and therefore is not illustrated or discussed any further herein. Such devices, however, are known in the art; and it is possible to use an ordinary typewriter mechanism to perform this indexing function as described in the copending U.S. patent application of George J. Yevick and Adnan Waly entitled "Microfiche Reading Attachment for a Typewriter," Ser. No. 131,050 filed Apr. 5, 1971, now U.S. Pat. No. 3,779,635 issued Dec. 18, 1973.

In actual tests performed in brightly lit rooms, this projection display device 10 has proved to be surprisingly immune to image wash-out by ambient light. This appears to be due to the fact that mirror M2 is inclined so that it reflects downwardly and to the right, and mirror M1 is inclined so that it reflects downwardly, to the left, and rearwardly. Thus, when downwardly incident ambient light strikes the front surface of the projection screen 16, the component of that light which is transmitted through the projection screen and strikes mirror m2 is thereby reflected downwardly and to the right, i.e., toward mirror M1. The light is then reflected by mirror M1 downwardly and rearwardly toward the bottom and rear of the interior of housing 12, where it is ultimately absorbed harmlessly by the internal surfaces of the housing walls. None of the downwardly inclined ambient light passing through the projection screen 16 is reflected back toward that screen, to produce the image wash-out effect which is universally observed with prior art rear projection devices when they are used in brightly lit environments. Yet this advantage is achieved without foregoing the use of the beam folding mirrors M1 and M2, an expedient which would require the use of a direct projection optical system contained in a long, thin housing.

With this mirror configuration, the only way that a light beam can be reflected toward the rear surface of the projection screen 16 is to originate within the separate right hand enclosure defined by the opaque front wall 18, and then to be reflected by mirror M1 toward mirror M2 and finally toward the projection screen 16. This enclosure, however, prevents any light beam, other than that projected by lamp 20, from originating at that location. The only light which can enter that enslosure must come through screen 16 and reflect off mirrors M2 and M1, so that it is diverted away from the screen in the manner described.

Since the angles of inclination of mirrors M1 and M2 are critical for proper focusing, locating and orientation of the image upon the projection screen 16, the mathematics for calculating these angles will now be discussed in detail. In setting up a three-dimensional Cartesian coordinate system for this discussion, the origin O is most conveniently set at the apex of the image light cone shining upwardly from the lens assembly 24. The positive $x$ direction is vertically upward, the positive $y$ direction is from right to left as seen in FIG. 2, and the positive $z$ direction is from rear to front (see FIGS. 4 and 5).

The optical axis A of the lens assembly 24 (FIGS. 2 and 4) then coincides with the $x$ axis, and intercepts mirror M1 at a point P1. An image light ray coinciding with the axis A travels upwardly until it strikes mirror M1 at point P1, and is then reflected upwardly, rearwardly and to the left along a path B until it intercepts mirror M2 at a point P2 (FIGS. 2 and 5). Then it is reflected by mirror M2 forwardly along a path C which intercepts the projection screen 16 at a point P3 (FIGS. 3 and 5). Thus path A, B, C is the folded axis of the optical system 24, M1, M2. (See also the geometric diagrams of FIGS. 7 through 9). the coordinates of the light cone apex or origin O are, of course, (0, 0, 0); the coordinates of point P1 are $x_1$, 0, 0); those of point P2 are ($x_2$, $Y_2$, $z_2$); and of point P3 ($x_3$, $Y_3$, $z_3$). Now let us simplify the calculations which follow by arbitrarily setting $x_3=x_2$ and $y_3=y_2$; which simply means that the mirrors M1 and M2 must be so oriented that path C is parallel to the $z$ axis. In addition, $z_3=d'$, the horizontal distance of screen 16 from the origin O (see FIGS. 8 and 9). Therefore, the coordinates of point P3, ($x_3$, $y_3$, $z_3$) = ($x_2$, $y_2$, $d'$).

Figure 7:
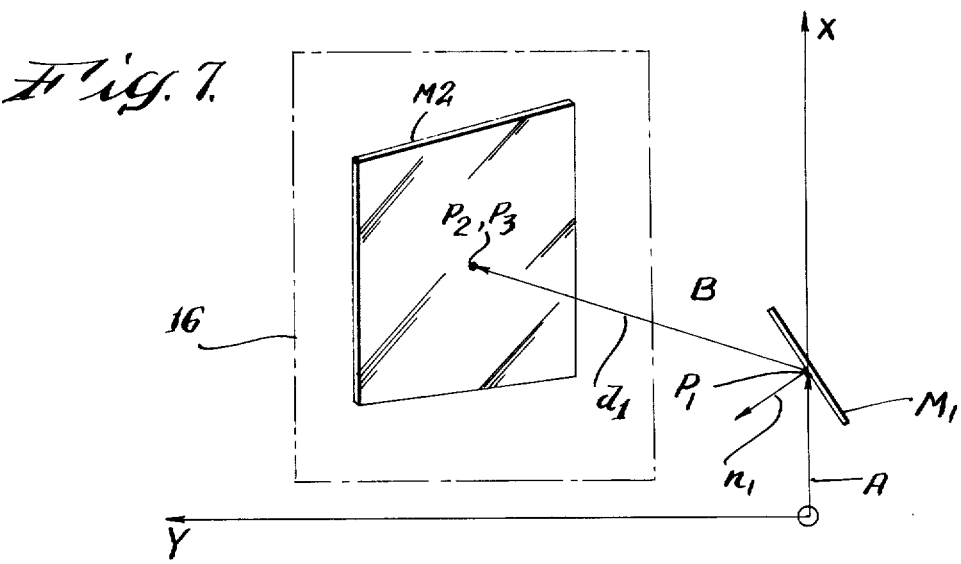
FIGS. 7, 8 and 9 are three geometric diagrams, looking in the negative $z$, positive $y$ and negative $x$ coordinate directions respectively, illustrating how the orientation angles of the beam-folding mirrors are calculated.
Figure 8:
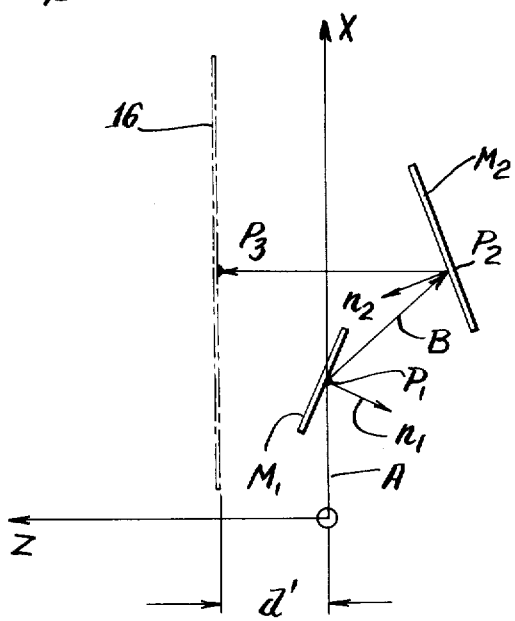
Figure 9:
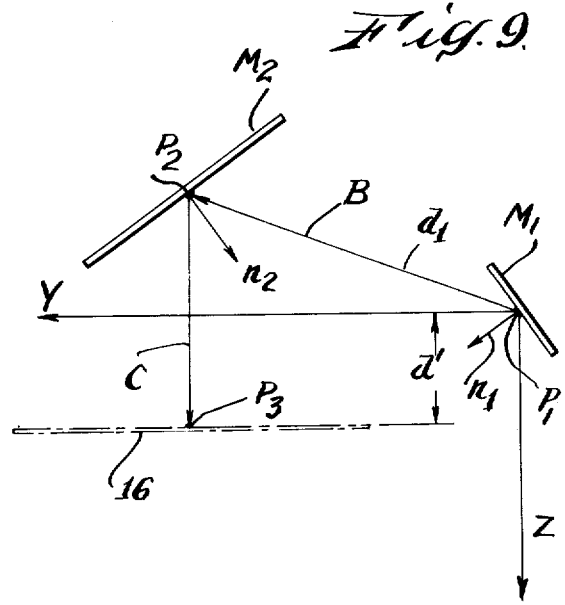

The inclinations of the mirros M1 and M2 are specified by giving the direction cosines of their unit normal vectors $\overline{n_1}$ and $\overline{n_2}$ respectively (FIGS. 7 through 9). By conventional vector algebra, it can be shown that, for a specific embodiment in which $x_3=x_2, y_3=y_2$ and $z_3=d'$, the direction cosines of unit vector $\overline{n_1}$ are:

$$\overline{n_1} = \frac{(x_2 - x_1 - d', y_2, z_2)}{\sqrt{2d_1} \sqrt{d_1 + (x_1 - x_2)}}$$

and those of unit vector $\overline{n_2}$ are:

$$\overline{n_2} = \frac{(x_2 - x_1, y_2, z_2 - d_1)}{\sqrt{2d_1} \sqrt{d_1 - z_2}}$$

where $d_1$ is the absolute magnitude of the length of path B between points P1 and P2. These expressions give the inclinations of mirrors M1 and M2 which are required to direct the optic axis A, B, C through a given set of points P1, P2 and P3.

An additional design criterion which must be met is rotation of the image 30, from the horizontal position in it which appears on the microfiche document 28 located in channel 32, to a vertical position upon the projection screen 16. Moreover, this rotation must be in the correct sense, so that the image appears on the screen right-side-up and in the correct orientation side-to-side. This is not a trivial problem in a complex system such as the present one, where there are two mirrors, and both their normal vectors $\overline{n_1}$ and $\overline{n_2}$ are in skew relationship to the coordinate system, i.e., each mirror rotates the image about a different axis.

Rodriques' formula gives the following expression for the vector $\overline{\omega}$ which describes a single rotation through an angle $\alpha$ about an axis having the direction vector $\overline{\Omega}$:

$$\overline{\omega} = 2\overline{\Omega} \tan \alpha/2$$

Then it can be shown that the resultant rotation $\overline{\omega_R}$ obtained by adding two rotations $\overline{\omega'}$ and $\overline{\omega''}$ about different axes is given by:

$$\overline{\omega_R} = \frac{\overline{\omega'} + \overline{\omega''} - (\frac{1}{2}) \overline{\omega'} \times \overline{\omega''}}{1 - (\frac{1}{4}) \overline{\omega'} \cdot \overline{\omega''}}$$

In this case, starting with a horizontal image, the resultant rotation $\overline{\omega_R}$ must rotate it through the equivalent of 90° in a negative sense about the $z$ axis to move the image into a vertical position but perpendicular to the plane of projection screen 16, plus 90° in a negative sense about the $x$ axis to make it parallel to the screen 16. According to Rodriques' formula, the equivalent $z$ rotation $$\overline{\omega_z} = 2\overline{\Omega_z} \tan \alpha_z/2$$

and the equivalent x rotation $$\overline{\omega_x} = 2\overline{\Omega_x} \tan \alpha_x/2$$

By definition $\overline{\Omega_z} = -\overline{z}$ and $\overline{\Omega_x} = -\overline{x}$, where $\overline{z}$ and $\overline{x}$ are the unit vectors in the $z$ and $y$ directions respectively. Since $$\alpha_z = \alpha_x = 90°  \tan \alpha_z/2 = \tan \alpha_x/2 = 1$$

and, therefore, the equivalent $z$ and $x$ rotations $$\overline{\omega_z} = -2\overline{z}$$

and $$\overline{\omega_x} = -2\overline{x}$$

respectively. Then, by the addition formula above, the desired resultant of the two equivalent rotations $\overline{\omega_z}$ and $\overline{\omega_x}$ is:

$$\overline{\omega_R} = \frac{\overline{\omega_z} + \overline{\omega_x} - (\frac{1}{2}) \overline{\omega_z} \times \overline{\omega_x}}{1 - (\frac{1}{4}) \overline{\omega_z} \cdot \overline{\omega_x}}$$

$$= \frac{-2\overline{z} - 2\overline{x} - (\frac{1}{2})(-2\overline{z}) \times (-2\overline{x})}{1 - (\frac{1}{4})(-2\overline{z}) \cdot (-2\overline{x})}$$

$$= -2\overline{x}, -2\overline{y}, -2\overline{z}$$

$$= -2 (1, 1, 1)$$

In actuality, the two rotations are not $z$ and $x$ rotations, but $\overline{\omega_1}$, the effect of reflection by mirror M1, and $\overline{\omega_2}$, the effect of reflection by mirror M2. The magnitude of the corresponding angular displacements $\alpha_1$ and $\alpha_2$ respectively is 180° in each case. To appreciate that fact, consider a three-dimensional coordinate system in which the $x$ and $z$ axes are parallel to the surface of a mirror, and the $y$ axis is perpendicular thereto. If this coordinate system is now reflected in the mirror, it is apparent that in the image of the coordinate system $$x = +y + x$$

$$y = -y$$

$$z = +z$$

Actually, however, this outcome is the net result of two separate effects which we may conveniently designate a) and b). Effect a) causes the image of the coordinate system to be rotated 180° about the normal to the mirror (i.e., about the $y$ axis), so that $$x = -x$$

$$y = +y$$

$$z = -z$$

Effect b), however, inverts all three of the above through the origin, so that finally:

$$x = +x$$

$$y = -y$$

$$z = +z$$

which is the observed result.

The rotations of effect a) for mirrors M1 and M2 are respectively represented by the expressions:

$$\overline{\omega_1} = 2\overline{n_1}\tan \alpha_1/2$$

and $$\overline{\omega_2} = 2\overline{n_2}\tan \alpha_2/2$$

Hence, by the addition formula:

$$\overline{\omega_R} = \frac{2\overline{n_1}\tan \frac{\alpha_1}{2} + 2\overline{n_2}\tan \frac{\alpha_2}{2} - 2\overline{n_1} \times \overline{n_2} \cdot \tan \frac{\alpha_1}{2}\tan \frac{\alpha_2}{2}}{1 - \overline{n_2} \cdot \overline{n_1} \tan \frac{\alpha_1}{2}\tan \frac{\alpha_2}{2}}$$

$$= \frac{2\overline{n_1}\cot \frac{\alpha_2}{2} + \overline{n_2}\cot \frac{\alpha_1}{2} - \overline{n_1} \times \overline{n_2}}{\cot \frac{\alpha_1}{2}\cot \frac{\alpha_2}{2} - \overline{n_1} \cdot \overline{n_2}}$$

where $\overline{n_1}$ and $\overline{n_2}$ are respectively the unit normal vectors of mirrors M1 and M2, and hence the axes of the rotations $\overline{\omega_1}$ and $\overline{\omega_2}$ respectively. Since $\alpha_1 = \alpha_2 = 180°$ for effect a), $$\overline{\omega_R} = \frac{2\overline{n_1} \times \overline{n_2}}{\overline{n_1} \cdot \overline{n_2}}$$

Substituting the values of $\overline{n_1}$ and $\overline{n_2}$ given above, $$\overline{\omega} = -2 \left( \frac{y_2}{d_1 - (x_2 - x_1 + z_2)}, 1, \frac{y_2}{d_1 - x_2 - x_1 + z_2} \right)$$

It is then seen that the desired outcome of the resultant $\overline{\omega_R} = -2(1, 1, 1)$ is then achieved when $d_1$ (the distance between points P1 and P2) is chosen equal to $x_2 - x_1 + z_2 + y_2$.

In calculating the magnification of the reader 10, we need to know D, the total length of the image light cone. Thus $$D = A + B + C = x_1 + d_1 + d' - z_2$$

But, since $$d_1 = x_2 - x_1 + z_2 + y_2, D = d' + x_2 + y_2$$

The magnification M is then given by $$(M + 1)f = D$$

where $f$ is the effective focal length of the lens assembly 24. The apex of the light cone, or the origin O may thus be considered to be the second principal point of the lens 24 or imaging device, i.e., the intersection of the principal plane on the image side of the lens 24 with the optical axis A.

In a particular embodiment of the invention, the following dimensions (in inches) were used:

$d' + 1.75$ $x_2 = 4.75$ $y_2 = 11.50$ $D = 18.00$ $P_1 = (1, 0, 0)$ $P_2 = (4.75, 11.5, -2.828)$ $P_3 = (4.75, 11.5, 1.75)$

The direction cosines of the mirror normal unit vectors were $\overline{n_1} = (-0.5908, 0.7835, -0.1927)$ $\overline{n_2} = (0.1927, -0.5908, 0.7835)$ The mirrors M1 and M2 are non-rectangular quadrilaterals, the corners of which may be completely specified by describing the image light cone which originates at the origin O. Since the micro-image 30 is rectangular, this "cone" is actually a pyramid with four edges. Edge No. 1 of the pyramid goes from the origin O to a corner No. 1 of mirrors M1, is reflected to a corner No. 1 of mirror M2, and then is reflected to a corner No. 1 of the screen 16. A similar analysis is true for pyramid edges Nos. 2, 3, and 4 and the corresponding corners of the mirrors and screen. If the starting points and direction components of the four edges of the image pyramid are specified for each of the three folded segments of the image pyramid which are centered about light paths, A, B and C respectively, then all four corners of both mirrors and the screen are uniquely specified. Thus, for the pyramid segment centered on light path A, the four pyramid edges are lines originating at the origin O and having the following direction components (in inches):

PATH A

Edge No. 1 = (0.753, −0.230, −0.178)
No. 2 = (1.931, 0.590, −0.456)
No. 3 = (1.489, 0.455, 0.351)
No. 4 = (0.675, 0.206, 0.159)

The terminations of these edges uniquely define corners 1 through 4 respectively of mirror M1.

Then for the pyramid segment centered on light path B, the four edges of the reflected light pyramid start from the corners of mirror M1 so specified, and are specified by the following set of direction components (in inches):

PATH B

Edge No. 1 = (1.477, 8,971, −5.540)
No. 2 = (8.469, 8.627, −4.080)
No. 3 = (10.242, 15.744, 1.723)
No. 4 = (0.178, 15.033, 1.288)

The terminations of the lines just specified define the corners of mirror M2.

From the corners so defined, the four edges of the image pyramid segment centered on path C are reflected along lines specified by the following set of direction components (in inches):

PATH C

Edge No. 1 = (−0.750, 7.25, 1.75)
No. 2 = (10.25, 7.25, 1.75)
No. 3 = (10.25, 15.75, 1.75)
No. 4 = (−0.75, 15.75, 1.75)

The terminations of those dges define the four corners of screen 16. Specifically, edge No. 1 intercepts the lower right hand corner of the projection screen 16, edge No. 2 the upper right corner, edge No. 3 the upper left corner, and edge No. 4 the lower left corner, as viewed in FIGS. 1 and 2.

In the specific embodiment described, with a total path length D = 18 inches for the folded optical axis A, B, C and an effective focal length $f = 7$ mm. for the lens assembly 24, the magnification M is approximately equal to $$\frac{D}{f} = \frac{18}{0.276}$$

or approximately 65. If the magnification M in this specific embodiment were any greater, it would be impossible to meet the criterion $\overline{\omega_R} = -2(1, 1, 1)$ necessary to produce an upright image on the screen 16. Instead, the image on the screen would be tilted from its upright position by an angle which is a function of $$\overline{\omega_R} = 2 \frac{\overline{n_1} \times \overline{n_2}}{\overline{n_1} \cdot \overline{n_2}}$$

In selecting a particular embodiment of the invention for a display projector, several dimensions are chosen. Thus, first the image area size and its distance from the x-y plane are selected. For the previously identified specific embodiment, the rectangular projection screen 16 (see FIG. 7) has dimensions of 11.0 and 7.5 inches which are respectively the height, H, as measured along x, and width, W, as measured along y, of the projection screen. The screen 16 is spaced 1.75 inches from the x-y plane so that the intersection of the optical axis C with the screen 16 occurs at $x_3, y_3, z_3$, where $z_3$ is 1.75 inches and $x_3$ and $y_3$ are respectively equal to $x_2$ and $y_2$, the intersection of optical axis B with mirror M2.

The distance D from apex O to the center of the projection screen is then selected on the basis of the desired magnification and for the above projection display is 18.0 inches. This selection of D then also specifies the effective focal length of lens assembly 24.

Following the selection of D, W and H, the distance $x_1$ for the length of the optical axis from origin or apex O to the intersection with the first mirror M1 is chosen. Distance $x_1$ must be sufficiently large to avoid interference between mirror M1 and lens 24. Since the optical axis is chosen to originally lie along the x axis, the selection of $x_1$ also determines $y_1$ and $z_1$ which are both zero.

The intersection of the optical axis with the second mirror M2 is chosen to determine the $y_2$ dimension of the intersection. Selection of $y_2$ generally is based upon considerations such as to avoid shadow effects of mirror M1 on the cone of light reflected by mirror M2 into screen 16. For the previous embodiment $y_2 = 11.5$ inches.

Since $D = d' + x_2 + y_2$, $d' = x_3$, and $D = x_2 + y_2 + z_3$. With $z_3 = 1.75$ inches, $y_2 = 11.5$ inches and $D = 18$ inches, $x_2 = 4.75$ inches.

It can be shown that $z_2$, the z dimension for the intersection of the optical axis with mirror M2 is $$z_2 = \frac{1}{2} \frac{(x_1 - x_2)^2 + y_2^2 - (D - z_3 - x_1)^2}{D - z_3 - x_1}$$

For the proper rotation of the image on screen 16 as stated above $D = x_2 + y_2 + z_3$ and substituting this value for D in the equation for $Z_2$ yields $$z_2 = \frac{-y_2(x_2 - x_1)}{x_2 - x_1 + y_2}$$

At this point the dimensions $x_1, y_1, z_1, x_2, y_2, z_2, x_1, y_3, z_3, D$, and the dimensions W and H of the projection screen and the corners $x, y$ and $z$ of the screen have been determined. The corners of projection screen 16 are known on the basis that optical axis C intersects screen 16 in its center.

In order to ascertain the location of the corners of mirrors M1 and M2, the following relationships are employed.

Let $\overline{n_1}$ be the normal to first planar mirror M1 and $\overline{p_1}$ be the point of intersection of mirror M1 with optic axis A. $\overline{p_1} = (x_1, O, O)$.

Let $a_x$, $a_y$, and $a_z$ denote the direction cosines of the edges of the light cone from the apex to the first mirror M1 with respect to the $x, y$ and $z$ axes respectively. It can then be shown that $$a_x = \frac{D}{\sqrt{D^2 + \frac{1}{4}(W^2 + H^2)}}$$

$$a_y = \pm \frac{1}{2} \frac{W}{\sqrt{D^2 + \frac{1}{4}(W^2 + H^2)}}$$

$$a_z = \pm \frac{1}{2} \frac{H}{\sqrt{D^2 + \frac{1}{4}(W^2 + H^2)}}$$

Since there are four edges to the pyramid light cone, there also are four unit vectors $\overline{a_1}, \overline{a_2}, \overline{a_3},$ and $\overline{a_4}$ to denote these edges from the apex or origin O to the corners of mirror M1. Thus, the four unit vectors are:

$\overline{a_1} = (|a_x|, -|a_y|, -|a_z|)$ for edge 1

$\overline{a_2} = (|a_x|, |a_y|, -|a_z|)$ for edge 2

$\overline{a_3} = (|a_x|, |a_y|, |a_z|)$ for edge 3

$\overline{a_4} = (|a_x|, -|a_y|, |a_z|)$ for edge 4

Let $L_i$ be the length of the distance along the $i_{th}$ edge of the light cone from the apex to the $i_{th}$ corner of the first mirror M1. Then the scalar product of the normal vector to mirror M1 with the vector lying in the plane of mirror M1, from a corner to the point of intersection of mirror M1 with the optical axis, is expressed as follows:

$\overline{n} \cdot (L_i \overline{a_i} - \overline{p_1}) = 0$ which in expanded form becomes
$L_i [n_x a_x + n_y a_y + n_z a_z] - n_x x_1 = 0$ and $$L_i = \frac{n_x x_1}{n_x a_x + n_y a_y + n_z a_z} = \text{the distance}$$

of the $i_{th}$ corner of mirror M1 from the apex of the light cone.

The values for $n_x$, $n_y$ and $n_z$ are determined by the equation given for $n_1$ on page 14 and by the equation given for $d_1$ on page 19. Hence, $L_1$ having been solved, the coordinates of the $i_{th}$ corner is determined as follows: $(x, y, z)_{ith} = L_i (a_x, a_y, a_z)$ corner Hence, when the values for $\overline{p_1}, \overline{p_2}, \overline{p_3}$, D, W and H in the previous particular embodiment are employed on the specific corner locations of the first planar mirror M1 as tabulated under Path A on page 20 are determined.

The corners for the second mirror M2 are determined using the following relationships. Let $\overline{p_2}$ be the point of intersection of the optic axis and the second mirror M2.

$\overline{p_2} = (x_2, y_2, z_2)$

The direction cosines of the edges of the light cone to the screen 16 from mirror M2 expressed with respect to the $x$, $y$, and $z$ axes respectively can be shown to be:

$$a_x = \pm \tfrac{1}{2} \frac{H}{\sqrt{D^2 + \tfrac{1}{4}(W^2 + H^2)}}$$

$$a_y = \pm \tfrac{1}{2} \frac{W}{\sqrt{D^2 + \tfrac{1}{4}(W^2 + H^2)}}$$

$$a_z = \frac{D}{\sqrt{D^2 + \tfrac{1}{4}(W^2 + H)^2}}$$

The four edges of the light cone incident upon screen 16 are then specified as follows:

$\overline{a_1} = (-|a_x|, -|a_y|, |a_z|)$
$\overline{a_2} = (|a_x|, -|a_y|, |a_z|)$
$\overline{a_3} = (|a_x|, |a_y|, |a_z|)$
$\overline{a_4} = (-|a_x|, |a_y|, |a_z|)$ Let $L_i$ now be the length of an edge of a light cone commencint at an imaginary apex $\overline{A}$ which would be the apex if the light cone incident upon screen 16 were extended all the way back from the projection screen 16 without interruption by the second mirror. Then $\overline{A} = \overline{p_3} - D\overline{c_3}$ where $\overline{p_3}$ is the location of the intersection of the optic axes with the projection screen and the center of the screen.

At any point on $\overline{p}$ on second mirror M2, the scalar product of the normal vector $n_2$ to mirror M2 with a vector lying in the plane of mirror M2 is:

$\overline{n_2} \cdot (\overline{p} - \overline{p_2}) = 0$

The $i_{th}$ edge of the light cone emanating from $\overline{A}$ will have a point such that $\overline{p} = L_i \overline{a_i} + \overline{A}$ and
substituting this value for p yields $\overline{n_2} \cdot (L_i \overline{a_i} - \overline{p_2} + \overline{p_3} + D \overline{c_z}) = 0$ Since the rotation of the image places the screen 16 parallel to the $x$–$y$ plane and the optic axis is incident upon the screen parallel to the $y$–$z$ plane $\overline{p_3} - \overline{p_2} = z_3 - z_2$ and thus $\overline{n_2} \cdot (L \overline{a_i} + (z_3 - z_2 - D)\overline{c_z}) = 0$
$L\overline{n_2} \cdot \overline{a_i} + n_z (z_3 - z_2 - D) = 0 = n_z (D + z_2 - z_3) \overline{n_2} \cdot \overline{a_i}$ The corner points of mirror M2 are then given by $(x, y, z)_{ith} = L_i (a_{ix}, a_{iy}, a_{iz}) + (x_2, y_2, z_3 - D)$ It is considered that the best way of constructing the microfiche reader 10 and of rigidly mounting the mirrors M1 and M2 in their skewed orientations described above, is to mold the entire cabinet 12, including the opaque front wall 18 and the viewing hood 17, of a light-weight but rigid material such as fairly dense foamed polystyrene. In addition, the rear wall 40 of the housing 12, as seen in FIGS. 3 and 5, is thickened so as to occupy the entire interior volume of the housing 12 directly behind the mirror M2. Further, the thickened portion of the rear polystyrene foam wall 40 is formed with a planar front surface or facet 42 which has just the right size and inclination to mount the mirror M2, which is cemented thereto. It will be readily appreciated therefore, that the styrene housing doubles as a rigid and integrally molded mounting for mirror M2.

The mirror M1 is mounted in a similar fashion, by filling almost the entire interior of the right hand enclosure behind opaque wall 18 with a block of styrene foam, which is integral with the rest of housing 12, and forming the styrene with an appropriate planar surface or facet 44 which is inclined downwardly, rearwardly and to the left, at just the right inclination to form a mounting for mirror M1 (see FIGS. 4 and 5). Once again, the mirror M1 would be secured to the planar surface 44 by suitable adhesive material after molding of the housing 12.

One side of the projection screen 16 is received within a vertical groove 46 formed in the housing 12 (see FIG. 5), and a channel-shaped member 48 receives the other side of the screen and is cemented to the interior wall of the housing 12 opposite the groove 46.

The image source for an optical system according to this invention need not be the microfiche sheet 28; it may instead be a strip of microfilm which is passed through the document channel 32 from reel to reel. The image source, moreover, does not necessarily have to be in microform, nor a photographic image, nor even a document. An ambient-light-resistant rear projection display device of the general type taught herein would also be quite useful for TV or any other cathode ray tube image projection applications. It could, for example, be used to enlarge an image from conventional TV screen size to theater size for viewing by a room full of people, or it might be used to enlarge the image on the face of a very small CRT to easily readable size. The reader will readily appreciate that the TV or CRT-generated image would be focused by a lens assembly such as 24 and reflected by mirrors such as M1 and M2 to a rear projection screen such as 16, as described above.

FIGS. 10 through 12 illustrate the combination, in a single envelope, of a television or other CRT electronic display and a projection optical display system in accordance with this invention. A cathode ray tube 100 has on the front surface thereof a display screen 116 consisting of a layer of phosphor material deposited over the interior surface of the face plate. The phosphor material could be zinc sulfide, or any other conventional material capable of functioning as a display screen in either of two operating modes. For use as a CRT screen, the phosphor material is excited in the conventional way by an electron gun 102 to generate an electron spot raster. On the other hand, the phosphor coating is optically similar to a ground glass or other light-diffusing surface coating, and, therefore, is well suited to serve also as an optical projection screen.

Mirrors M101 and M102 are mounted at appropriate skewed angles within the cathode ray tube 100, and correspond to mirrors M1 and M2 of the microfiche reader 10 described above. Suitable mounting means, not shown, are provided for securing mirrors M101 and M102 in the desired orientation; means for mounting elements in fixed position within an evacuated envelope are well known in the electron tube manufacturing art. A transparent window 105 is formed in the bottom of the envelope of tube 100 in proper position to direct an optical image beam, from a point below the tube, upwardly toward mirror M101. An optical lens system 107, seen in FIGS. 10 and 12, is aligned with the window 105 and is used for projecting the image beam therethrough. The image could come from a photographic microform or any other conventional image source contained in an image projection device 109. After passing through window 105, the image beam is reflected by mirrors M101 and M102, in that order, to the screen 116. The mirror orientations and upward image beam paths are simil ҃ to those described in connection with the microfiche reader 10 above, so that the same ambient light immunity is achieved. The combined electronic and optical display device illustrated in FIGS. 10 through 12 can be used to generate displays in either of two ways, electronic and optical, at different times, and also can generate superimposed electronic and optical displays simultaneously.

Whether employed in a conventional photographic microform document reader, in a combined electronic and optical display tube, or any other environment, the rear projection display optics of this invention have the significant advantage of providing a very bright image which is highly immune to wash-out by that component of ambient light which is transmitted through the rear projection screen. As a result, a display device in accordance with this invention can be used in brightly lit environments.

Apparatus identical to that of FIGS. 10 through 12 can also be used for deriving photographs or hard copy from a CRT display, if element 109 is a camera, photostatic copier or similar image capturing device (instead of an image projection source as described above). Those skilled in the electronic arts will readily appreciate that the image raster generated on the CRT screen 116 by the electron gun 102 is visible as well from behind the phosphor coating of the CRT screen as it is from in front. Therefore, the optical system formed by mirrors M101 and M102 within the CRT envelope "sees" the electronically displayed image (with a mirror reversal because they are behind the screen 116), and they reflect this reversed image as an object beam through window 105 to lens system 107, which in turn focuses the image on a photographic emulsion, electrostatic receptor, or any other means within device 109 for capturing a permanent image or generating hard copy. The mirror image reversal is not a serious drawback, since it can be dealt with later by reversing a photographic transparency for projection purposes, or mirror reading of non-transparent hard copy. Note that the light cone of the object beam from the cathode ray screen has its apex on the principal point on the side of the tube.

In the past, continuous production of permanent images from a CRT display (e.g. at a computer terminal) while simultaneous human observation of the display is in progress, has required duplicate CRT readouts. One CRT had to be available for human observation, while another was dedicated to photographic, electrostatic, or other permanent image capturing apparatus. Usually such apparatus was coupled to the second CRT by light-tight hoods in such a way that human observation of the second CRT was precluded, in order to avoid image fogging by ambient light, and to prevent the human observers from interposing themselves between the CRT and the photographic or electrostatic image capturing device. This invention, on the other hand, permits a single CRT 100 to be viewed by a human observer stationed in front of the screen 116, while simultaneously projecting the same image to a permanent recording device 109 employing the lens system 107 and located below the CRT.

With reference to FIGS. 13 and 14, a photographic camera 150 utilizing the folded optical device in accordance with the invention is shown. Camera 150 includes a generally rectangular shaped housing 152 having a narrow front wall 154 and a larger side wall 156. A photographic film 158, which is unwound from a roll 160 and taken up by a roller 162, is mounted for parallel movement with the larger side wall 156.

An imaging device 164 in the form of a fixed focal lens is mounted on the front wall 154 and directs and focuses light along an optical axis 166. Optic axis 166 is coincident with the $x$ axis of an $x$, $y$, $z$, orthogonal coordinate system. An object viewing lens 167 is located below lens 164 in alignment with axis 166 to view the object through lens 164. Mirror M1 is mounted for pivot movement in the direction of arrow 169 to enable the user to view the object through lenses 167 and 164. The narrow front wall 154 is parallel to the $y$-$z$ plane and the larger side wall is parallel to the $x$-$y$ plane.

Lens 164 produces a cone of light which starts from the second principal point 168 as an apex and a coordinate origin 168. The cone of light is incident upon a first planar mirror M1. Mirror M1, in turn, reflects the image beam at a second mirror M2 which produces a focused image on a rectangular image area 170 on film 158.

The design of camera 150 commences with a selection of the dimensions W and H of image area 170. In the embodiment, W and H are chosen equal, e.g. 2.5 inches, for a square image area.

Image area 170 lies in a plane which is parallel to the $x-y$ plane and spaced from this by a distance $d'$ or $z_3$. $z_3$ is selected sufficiently large to avoid any portion of mirror M1 from touching or extending beyond wall 156 of housing 152. A distance of 0.5 inches for $z_3$ appears sufficient.

The dimension D is chosen on the basis of the focal length of lens 168. In the case of a typical camera, D may be chosen as 6 inches and represents also the focal length for lens 164.

The dimension $x_1$, i.e. the length of optic axis 166 from apex 168 to mirror M1 is selected sufficiently large to avoid interference between lens 164 and mirror M1. Note that selection of the point of intersection $P_1$, of optic axis 166 with mirror M1 includes all of its dimensions $x_1$, $y_1$, $z_1$ which are respectively 0.5, 0, 0 inches.

The selection of $P_2$, the point of intersection of the optic axis with the second mirror M2 is determined by choosing the $y_2$ dimension. $Y_2$ should be selected so as to preserve the compactness of camera 150, yet not too small lest mirror M1 would cast shadows on the cone of light reflected from mirror M2. As a general role, $y_2$ should be greater than half the width W of image area 170 and can be 2.5 inches.

With $D = 6$ inches, $y_2 = 2.5$ inches, $z_3 = .5$ inches, $x_2$ is determined by the condition $D = x_2 + y_2 + z_3$ and thus must be 3 inches. The value of $z_2$ is determined by the relationship $$z_2 = - \frac{y_2 (x_2 - x_1)}{x_2 - x_1 + y_2}$$

and is $- .9375$.

With these values in mind, the input parameters for camera 150 are:

$P_1$ (the intersection of the optic axis with the first mirror M1) is (1.5, 0, 0) inches $P_2$ (the intersection of the optic axis with the second mirror M2) is (3, 2.5, $-$ .9375) inches $P_3$ (the intersection of the optic axis with the screen 170) is (3, 2.5, .5) inches W (the width of screen 170) is 2.5 inches H (the height of screen 170) is 2.5 inches D (the total length of the optic axis) is 6 inches.

The corners of screen 170 are determined on the basis that $P_3$ lies in the center of screen 170. Thus Corner 1 $(P_{3x} - \frac{1}{2} H, P_{3y} - \frac{1}{2} W, z_3) = (1.75, 1.25, .5)$ inches Corner 2 $(P_{3x} + \frac{1}{2} H, P_{3y} - \frac{1}{2} W, z_3) = (4.25, 1.25, .5)$ inches Corner 3 $(P_{3x} + \frac{1}{2} H, P_{3y} + \frac{1}{2} W, z_3) = (4.25, 3.75, .5)$ inches Corner 4 $(P_{3x} - \frac{1}{2} H, P_{3y} + \frac{1}{2} W, z_3) = (1.75, 3.75, .5)$ inches The displacement of screen or image area 170 from the optic axis is further selected to be greater than one-half the diameter of lens 164 to avoid interference therewith.

When the above input values are applied to the equations for determining the corners of mirrors M1 and M2, the following corner values are found:

For mirror M1 (in inches)
Corner 1 (1.241, $-$ 0.259, $-$ 0.259)
Corner 2 (2.767, 0.576, $-$ 0.576)
Corner 3 (0.395, 0.394, 0.395)
Corner 4 (1.029, $-$ 0.214, 0.214)

For mirror M2 (in inches)
Corner 1 (2.213, 1.713, $-$ 1.724)
Corner 2 (3.903, 1.596, $-$ 1.163)
Corner 3 (4.201, 3.701, 0.263)
Corner 4 (1.997, 3.502, $-$ 0.687)

A camera housing 152 which would hold mirrors M1 and M2 with a 2½ × 2½ inch image area would be approximately 4½ inches long in the $x$ direction, 2⅛ inches long in the $z$ direction, and about 4¼ inches in the $y$ direction.

Other dimensions for housing 152 can be established by selecting different input parameters. The mirror dimensions may then vary considerably from the above camera example. Generally, the maximum $x$ dimension of mirror M2 should not be greater than $x_2$ (the intersection of the optic axis with M2) plus ½ the height of the $x$ dimension of the projection area 170. Furthermore, the first mirror M1 should not have any segments extending above (along the $x$ axis) the image area 170. Mirror M2 further may not be so sized and located as to be interference with the projection area 170. The corners of the mirrors M1 and M2 preferably lie on the perimeter of the light cone.

In another example for a camera, the dimensions of housing 152 would be approximately 2¾, 4⅝, and 2 inches for the $x$, $y$, and $z$ dimensions respectively with an image area of 2½ by 2½ inches, spaced 1¾ inches from the $x-z$ plane, and ½ inch from the $x-y$ plane. The mirror corner locations would be in inches:

For mirror M1
corner 1 .4,$-$ .1,$-$ .1
corner 2 .857, .214,$-$ .214
corner 3 .667, .167, .167
corner 4 .352,$-$ .088, .088

For mirror M2
corner 1 .750, 2.250,$-$ 1.500
corner 2 2,363, 2,167,$-$ 1.167
corner 3 2.750, 4.250, 0.500
corner 4 .428, 4.071,$-$ 0.214

Although in the latter example corner 3 of M2 lines in the plane of image area 170, a reduction of the image area dimensions of 10% would correspondingly alter the locations of the corners of mirror M2 and remove corner 3 from the plane of image area 170.

An indication of whether mirror M1 casts shadows on the folded beam reflected by mirror M2 can be done either mathematically or graphically. In a graphic inspection, the projections of the mirror arrangement on the $x-y$ plane, $y-z$, and $x-z$ planes will reveal undesirable interferences.

Having thus described a camera and projection display utilizing a pair of skewed mirrors, the advantages of the invention can be appreciated. Small cameras may be formed with large image areas. A projection display which is substantially immune to ambient light sources is provided.

Since the foregoing description and drawings are merely illustrative, the scope of protection of the invention has been more broadly stated in the following claims; and these should be liberally interpreted so as to obtain the benefit of all equivalents to which the invention is fairly entitled.

What is claimed is:

1. A compact imaging apparatus for projecting and rotating an image, comprising:
   A. a housing in which is defined
      1. an $x$, $y$, $z$ orthogonal coordinate system having an origin;

2. an image plane parallel to the plane defined by the $x$ and $y$ axes and displaced therefrom by a distance $d'$, and
3. an image area in the image plane spaced from the origin of said coordinate system by a predetermined distance measured on said $y$ axis, B. an imaging device for projecting an image, said imaging device being mounted in said housing and having an optical axis which originates at the origin of said coordinate system and is parallel to said $x$ axis, and C. means for reflecting the image projected from said imaging device along a reflected optical axis which is an extension of said imaging device optical axis and for rotating the image a predetermined degree to be focused on said image plane in said image area with a desired orientation, said means comprising
   1. a first planar mirror having a normal vector $\overline{n_1}$ the direction cosine of which is specified by the equation $$\overline{n_1} = \frac{(x_2 - x_1 - d', y_2, z_2)}{\sqrt{2d_1} \sqrt{d_1 + (x_1 - x_2)}}$$

and
   2. a second planar mirror having a normal vector $\overline{n_2}$, the direction cosine of which is specified by the equation $$\overline{n_2} = \frac{(x_2 - x_1, y_2, z_2 - d_1)}{\sqrt{2d_1} \sqrt{d_1 - z_2}}$$

where $d_1$ is the distance between the point $(x_1, y_1, z_1)$ of intersection of said optical axis with said first mirror and the point $(x_2, y_2, z_2)$ of intersection of said reflected optical axis with said second mirror, the point of intersection of said reflected optical axis with said image plane being $(x_3, y_3, z_3)$.

2. The compact imaging device as claimed in claim 1 wherein the total length D of said optical axis and reflected optical axis from said origin to said image plane is specified by the equation $$D = x_2 + y_2 + z_3.$$

3. The compact imaging device as claimed in claim 2 further comprising:
a projection screen mounted in said housing coincident with said image plane at said image area and wherein,
said imaging device and said means for reflecting and rotating the projected image cooperate to display the projected image on said projection screen with a magnification M specified by the equation;

$$(M + 1)f = D$$

where $f$ is the effective focal length of said imaging device.

4. The compact imaging device as claimed in claim 1 wherein $d_1$ is specified by the equation $$d_1 = x_2 - x_1 + y_2 + z_2.$$

* * * * *

UNITED STATES PATENT OFFICE
CERTIFICATE OF CORRECTION

PATENT NO. : 3,947,104
DATED : March 30, 1976
INVENTOR(S) : ADNAN WALY and GEORGE J. YEVICK It is certified that error appears in the above-identified patent and that said Letters Patent are hereby corrected as shown below:

Col. 2, line 14, "be" should be --by--.
Col. 4, line 60, "m" should be --M--.
Col. 5, line 16, "enslosure" should be --enclosure--.
Col. 5, line 45, "$Y_2$" should be --$y_2$--.
Col. 5, line 45, "$Y_3$" should be --$y_3$--.
Col. 7, line 52, "$2n_1$" should be --$2\bar{n_1}$--.
Col. 11, line 26, "$L_1$" should be --$L_i$--.
Col. 11, line 28, "$(\bar{x}, 6, z)\ i_{th} = L_i\ (a_x, a_y, a_z)$ corner" should be --$(x, y, z)\ i_{th\ corner} = L_i\ (a_x, a_y, a_z)$--.
Col. 12, line 11, "p" should be --$\bar{p}$--.
Col. 12, line 21, "$L\bar{n_2} \cdot \bar{a_1} + n_z (z_3 - z_2 D) = 0 = (D + z_2 - z_3)\bar{n_2} \cdot \bar{a_1}$" should be --$L\bar{n_2} \cdot \bar{a_1} + n_z (z_3 - z_2 D) = 0$
$L_i = \dfrac{n_z (D + z_2 - z_3)}{\bar{n_2} \cdot \bar{a_i}}$--.
Col. 12, line 23, "$z)\,i_{th} =$" should be --$z)\,i_{th\ corner} =$--.

Signed and Sealed this

Second Day of November 1976

[SEAL]

Attest:

RUTH C. MASON
*Attesting Officer*

C. MARSHALL DANN
*Commissioner of Patents and Trademarks*